US009386366B2

(12) United States Patent
Koch et al.

(10) Patent No.: US 9,386,366 B2
(45) Date of Patent: Jul. 5, 2016

(54) ACTIVE DESIGN OF EXHAUST SOUNDS

(71) Applicant: Eberspächer Exhaust Technology GmbH & Co. KG, Esslingen (DE)

(72) Inventors: Viktor Koch, Goeppingen (DE); Rolf Jebasinski, Filderstadt (DE)

(73) Assignee: Eberspächer Exhaust Technology GmbH & Co. KG, Esslingen (DE)

( * ) Notice: Subject to any disclaimer, the term of this patent is extended or adjusted under 35 U.S.C. 154(b) by 441 days.

(21) Appl. No.: 13/691,022

(22) Filed: Nov. 30, 2012

(65) Prior Publication Data

US 2013/0142352 A1 Jun. 6, 2013

(30) Foreign Application Priority Data

Dec. 2, 2011 (DE) ......................... 10 2011 120 051

(51) Int. Cl.
*H04B 1/00* (2006.01)
*H04R 1/22* (2006.01)
*G10K 15/02* (2006.01)

(52) U.S. Cl.
CPC *H04R 1/22* (2013.01); *G10K 15/02* (2013.01); *G10K 2210/12822* (2013.01)

(58) Field of Classification Search
None
See application file for complete search history.

(56) References Cited

U.S. PATENT DOCUMENTS 4,177,874 A 12/1979 Angelini et al.
5,229,556 A 7/1993 Geddes
5,233,137 A 8/1993 Geddes
5,336,856 A 8/1994 Krider et al.
5,343,533 A 8/1994 Geddes
5,432,857 A 7/1995 Geddes
5,600,106 A 2/1997 Langley
5,619,020 A 4/1997 Jones et al.

(Continued)

FOREIGN PATENT DOCUMENTS

CN 2750414 Y 1/2006
DE 197 01 801 C2 10/1998

(Continued)

OTHER PUBLICATIONS

Wikipedia: Integrierter Schaltkreis; Version dated Nov. 14, 2011 (searched on Aug. 29, 2012); Internet: <URL: http://de.wikipedia.org/w/index.php?title=Integrierter_Schaltkreis&oldid=95979923>.

(Continued)

*Primary Examiner* — Thang Tran
(74) *Attorney, Agent, or Firm* — McGrew and Tuttle, P.C.

(57) ABSTRACT

A sound generator system (1, 70), for a vehicle with internal combustion engine (15) and/or electric motor, has an electroacoustical transducer (11) and a control unit (24, 74). Transducer (11) produces an acoustical signal based on an electrical input signal and is connected to an acoustic line. The control unit (24, 74) creates a primary audio signal with frequencies from a given frequency range, to selectively amplify selected segments ("V") of the primary audio signal so that the audio signal (41) amplified in the selected segments has a section in which all audio signal values correspond to a maximum amplitude value that is specified for the segment, and the audio signal (41) amplified in the selected segments is continuous at transitions from the at least one section to neighboring sections, and wherein the audio signal (41) generated by the control unit (24) forms the basis of the electrical input signal.

20 Claims, 4 Drawing Sheets

(56) References Cited

U.S. PATENT DOCUMENTS

| | | | | |
|---|---|---|---|---|
| 5,682,134 | A * | 10/1997 | Stallbohm | 340/426.27 |
| 5,693,918 | A | 12/1997 | Bremigan et al. | |
| 5,703,337 | A | 12/1997 | Geisenberger | |
| 5,872,852 | A * | 2/1999 | Dougherty | 381/86 |
| 5,907,622 | A * | 5/1999 | Dougherty | 381/57 |
| 8,155,343 | B2 * | 4/2012 | Honji et al. | 381/86 |
| 8,885,845 | B2 * | 11/2014 | Honji et al. | 381/86 |
| 2005/0169484 | A1 | 8/2005 | Cascone et al. | |
| 2006/0037808 | A1 | 2/2006 | Krüger et al. | |
| 2006/0177797 | A1 | 8/2006 | Costello et al. | |
| 2008/0053747 | A1 | 3/2008 | Krueger et al. | |
| 2008/0192954 | A1 | 8/2008 | Honji et al. | |
| 2008/0205662 | A1 * | 8/2008 | Matejczyk | 381/71.4 |
| 2009/0255754 | A1 | 10/2009 | Kruger et al. | |
| 2011/0000734 | A1 | 1/2011 | Krüger et al. | |
| 2012/0027220 | A1 | 2/2012 | Sugawara | |

FOREIGN PATENT DOCUMENTS

| | | | |
|---|---|---|---|
| DE | 1 975 1596 | A1 | 6/1999 |
| DE | 197 26 271 | C2 | 7/2001 |
| DE | 10 2006 042 224 | B3 | 1/2008 |
| DE | 10 2006 053 855 | B4 | 11/2008 |
| DE | 10 2007 055 477 | A1 | 5/2009 |
| DE | 10 2008 018 085 | A1 | 10/2009 |
| DE | 10 2009 031 848 | A1 | 1/2011 |
| EP | 0 373 188 | A1 | 6/1990 |
| EP | 0 674 097 | A1 | 9/1995 |
| EP | 0 755 045 | A2 | 1/1997 |
| EP | 0 916 817 | A2 | 5/1999 |
| EP | 1 055 804 | A1 | 11/2000 |
| EP | 1 627 996 | A1 | 2/2006 |
| EP | 1 865 494 | A1 | 12/2007 |
| JP | H03-279044 | A | 12/1991 |
| JP | H05-006178 | A | 1/1993 |
| JP | H05-035270 | A | 2/1993 |
| JP | H08-056131 | A | 2/1996 |
| JP | 2001-282263 | A | 10/2001 |
| JP | 2002-151975 | A | 5/2002 |
| WO | 89/07701 | A1 | 8/1989 |
| WO | 2010/119521 | A1 | 10/2010 |

OTHER PUBLICATIONS

Wikipedia: Digitaler Signalprozessor, Version Nov. 11, 2011 (searched on Aug. 29, 2012); Internet: <URL:http://de.wikipedia.org/w/index.php?title=Digitaler_Signalprozessor &oldid=95861352>.

Wikipedia: Übersteuern; Version dated Jul. 2, 2011 (searched on Aug. 29, 2012); Internet: <URL:http://de.wikipedia.org/w/index.php?title=%C3%Cbersteuern_%28Signalverarbeitung%29 &oldid=91179460>.

Eberspächer: Der AbgasProfi; Information für Kfz-Meisterwerkstätten und Teilehandel; Oct. 19, 2006, p. 1 to 3.

Lüke, H.D.: Signalverarbeitung—Grundlagen der digitalen und analogen Nachrichtenübertragungsysteme. Vierte Auflage. Berlin Heidelberg New York: Springer-Verlag, 1990, p. 42—ISBN 3-540-52177-1.

* cited by examiner

ACTIVE DESIGN OF EXHAUST SOUNDS

CROSS REFERENCE TO RELATED APPLICATIONS

This application claims priority of Patent Application No. 10 2011 120 051.0, filed Dec. 2, 2011 in Germany, entitled "AKTIVE GESTALTUNG VON ABGASGERÄUSCHEN", the contents of which is hereby incorporated by reference in its entirety.

FIELD OF THE INVENTION

The invention concerns the active design of exhaust sounds for vehicles that are operated with internal combustion engines, hybrid drive units or electric motors. The invention pertains in particular to the influencing of the overall acoustic pattern of exhaust sounds.

BACKGROUND OF THE INVENTION

The operation of internal combustion engines, regardless of their particular design, such as reciprocating engine, pistonless rotary engine or free-piston engine, occurs in repeated strokes in each of which certain processes are carried out, such as intake and compression of a fuel and air mixture, combustion, and discharging of the combusted fuel air mixture, or the like. The sounds generated hereby propagate through the engine on the one hand directly as solid-borne sound and on the other hand they exit along with the combustion gases through the exhaust system or exhaust line of the engine.

The sounds propagating through the internal combustion engine as solid-borne sound can generally be well insulated by suitable insulating materials in the engine compartment of a vehicle.

To reduce the acoustic emissions escaping with the exhaust gases, sound-absorbing devices are usually arranged in the exhaust duct. Such silencers can operate, for example, according to the absorption and/or reflection principle. So-called active silencing or sound cancellation systems are also known, which superimpose electroacoustically generated anti-noise pulse trains on the sonic pulse trains transported with the combustion gases. Descriptions of such active silencing systems, also known as anti-sound systems, will be found, for example, in the documents U.S. Pat. No. 4,177,874, U.S. Pat. No. 5,229,556, U.S. Pat. No. 5,233,137, U.S. Pat. No. 5,343,533, U.S. Pat. No. 5,336,856, U.S. Pat. No. 5,432,857, U.S. Pat. No. 5,600,106, U.S. Pat. No. 5,619,020, EP 0 373 188, EP 0 674 097, EP 0 755 045, EP 0 916 817, EP 1 055 804, EP 1 627 996, DE 197 51 596, DE 10 2006 042 224, DE 10 2008 018 085 and DE 10 2009 031 848.

However, for several reasons a complete elimination of exhaust sounds is not desirable. On the one hand, an almost silent vehicle represents a substantial safety risk in road traffic, since a traffic participant can only then recognize it, when it is already in his or her's central field of vision. A traffic participant will therefore normally not perceive extremely low-noise vehicles approaching from the side or even from behind. Furthermore, most vehicle drivers are used to estimating the speed and acceleration of their vehicle and potential irregularities in the vehicle's drive system by means of the exhaust sounds. Thus, for example, the noise reduction associated with cylinder cutoff when the vehicle is at standstill frequently causes concern among the passengers as to a possible malfunctioning of the vehicle's drive system. Finally, it should also be mentioned that the impression that a vehicle leaves on people is dictated not only by its optical appearance, but also to just as great a degree by the acoustic pattern of its driving noise and especially its exhaust sound.

In the case of modern Diesel vehicles and vehicles with hybrid drive systems it is generally no longer possible to judge the actual engine power or vehicle speed in the usual way from the exhaust sound. Just so, a driver of a vehicle with cylinder cutoff engaged can never be quite certain he has not stalled the engine.

Therefore, active sound systems have been developed for use in exhaust systems of vehicles with which it is possible to generate an exhaust sound synthetically. Corresponding systems have an electroacoustical transducer that is connected to the exhaust line of an internal combustion engine by a connector piece in order to superimpose electroacoustically generated sonic waves on the sonic waves stemming from the combustion process in the engine. In this way, the exhaust sounds of a vehicle can be deliberately modified. The electric input signal of the transducer is generated by a control as a so-called control signal, taking into account current values of engine parameters, such as engine speed or firing order.

Present embodiments of such control have a software processing device for generating the control signal, in which the particular control signal generated is produced according to the exhaust sound pattern desired for the particular engine operating state. Due to technical limitations, the frequency range of such a software-generated control signal is at present limited to around 500 Hz, however, with the consequence that the resulting exhaust sound is perceived as being synthetic and not natural. By a natural sounding exhaust sound is meant here an exhaust sound with an acoustic pattern as is created with traditional exhaust systems making use of mufflers.

For a natural appearing acoustic pattern, the control signal should have higher frequency components, yet generating these separately is a heavy burden on the control device and therefore not practical.

SUMMARY OF THE INVENTION

Based on the above, it is therefore desirable to provide a sound generating system for exhaust systems of vehicles with internal combustion engines or hybrid drive systems or for vehicles with pure electric drive systems that produces a natural sounding exhaust sound, characteristic of particular drive system conditions of the vehicle.

According to the invention. embodiments of such a sound generating system are provided for a vehicle with an internal combustion engine and/or electric motor including an electroacoustical transducer and a control unit. The electroacoustical transducer is configured to produce an acoustical signal in dependence on an electrical input signal and is connected to an acoustic line configured for transmission of the sound to the surroundings of the vehicle and/or into an exhaust line of the vehicle. The control unit is configured to create a primary audio signal with frequencies from a first frequency range, to selectively amplify selected segments of the primary audio signal so that the audio signal with the amplified selected segments has at least one section in which all audio signal values correspond to a maximum amplitude value that is specified for the segment, and the graph of the audio signal amplified in the selected segments is continuous at the transitions from the at least one section to its neighboring sections, and wherein the audio signal generated by the control unit forms the basis of the electrical input signal.

Such a section-wise amplitude-limited input signal for the electroacoustical transducer has a high harmonic content that lends a natural acoustic pattern to the acoustical signal generated by it, comparable to conventional exhaust systems of internal combustion engines.

According to embodiments, the primary audio signal is not amplified and clipped in regions other than the selected segments.

In this context, it should be pointed out that the terms “comprise”, “have”, “contain”, “include” and “with” as used in this specification and the claims, as well as their grammatical modifications, are generally to be understood as a non-exhaustive listing of features, such as process steps, devices, ranges, magnitudes and the like, and do in no way preclude the presence of other or additional features or groupings of other or additional features.

In advantageous embodiments of such sound generating systems, the control unit is configured to generate the primary audio signal depending on the respective current operating parameters of the vehicle engine, thereby ensuring a direct coupling of the generated acoustic pattern to the respective current operating condition of the engine.

The acoustic line in embodiments of the sound generator systems has different configurations according to the application purpose. For example, in the case of a vehicle with an internal combustion engine, the acoustic line is configured for connection to an exhaust line of the engine so that acoustic signals generated by the electroacoustic transducer are superimposed on the exhaust sounds conducted in the exhaust line when the acoustic line is fastened to the exhaust line. In the case of an exhaust-free vehicle, such as an electric vehicle, the acoustic line is configured for connection to the body of the vehicle so that an acoustic signal generated by the acoustic transducer is emitted from the acoustic line directly into an outside region or even into an inside region of the vehicle.

Embodiments for use with internal combustion engines have an additional electroacoustic transducer that is configured to convert a sonic pressure present on the exhaust line into an electrical measurement signal and is arranged downstream from the connection of the acoustic line with regard to the exhaust flow. The control unit in this case is configured to generate the primary audio signal depending on the measurement signal. A corresponding embodiment enables a reduction of the sound emissions resulting from the combustion process in the engine based on anti-sound, together with an active modification or design of the exhaust sound.

In order to create a high harmonic content having high frequencies, the control unit in advantageous embodiments of such sound generator systems is configured to generate the audio signal in the selected segments by the following work steps: multiplication of all values of the primary audio signal in the selected segment by a constant value so that the multiplied values in at least one part of the selected segment are greater than a given maximum amplitude value, comparison of each of the so multiplied values with the given maximum amplitude value, and if this value is greater than the maximum amplitude value setting the multiplied value at the maximum amplitude value.

Other advantageous embodiments of the above-indicated sound generator systems enable an influencing of the higher frequency harmonic content of the input signal of the electroacoustical transducer, by which the acoustic pattern of the acoustic signal generated by the transducer can be more easily adapted to given acoustic patterns. For this, the control unit is configured to generate the audio signal in the selected segments by the following work steps: multiplication of all values of the primary audio signal in the selected segment by a constant value so that the multiplied values in at least one part of the selected segment are greater than the given maximum amplitude value, comparison of each of the multiplied values to the maximum amplitude value, repeated multiplication of the first multiplied value by a multiplication factor depending on the difference between the first multiplied value and the maximum amplitude value such that a section is formed in the selected segment in which all values of the audio signal correspond to the maximum amplitude value and the audio signal forms at the boundaries of this section a corner to the neighboring sections. The content of the higher frequency harmonics can be adjusted by the degree the audio signal generated in the second multiplication is rounded to the segment of the maximum amplitude values.

The control unit in embodiments of the sound generator systems is configured to create the audio signal by software processing and thus can be advantageously implemented in existing control units for active sound silencing systems without structural changes. In other embodiments, the control unit comprises an electronic circuit for processing and optionally also for generating of the primary audio signal.

For amplification of the selected segments of the audio signal, embodiments of the control unit have an amplifier device that is operated to limit the audio signal in saturation, and thus generates an overdriven audio signal according to the specified. Preferably one use for this an amplifier device with controllable gain factor, and the controlling of the gain factor is time-variable in dependence on engine parameters, so that only certain segments of the primary audio signal are overdriven. In this context it should be pointed out that the term “control” is used throughout this document, unless otherwise explicitly indicated, departing from German language usage, as being equal to the term “feedback control”. This also pertains to all grammatical transformations of these two terms. Therefore, in this document, the term “controlling” can also involve a feeding back of a control variable or its measured value, just as the term “feedback control” can pertain to a simple non-feedback control circuit.

BRIEF DESCRIPTION OF THE DRAWINGS

The forgoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

Further features of the invention will emerge from the following description of exemplary embodiments in connection with the claims as well as the figures. In the figures, the same or similar elements are indicated by the same or similar reference numbers. It is pointed out that the invention is not limited to the embodiments of the described sample embodiments, but rather is determined by the scope of the enclosed patent claims. In particular, individual features in the embodiments of the invention can be realized in different number and combination than in the examples given below. In the following explanation of exemplary embodiments of the invention, reference is made to the enclosed figures, wherein:

DETAILED DESCRIPTION OF EXEMPLARY EMBODIMENTS

Figure 1:
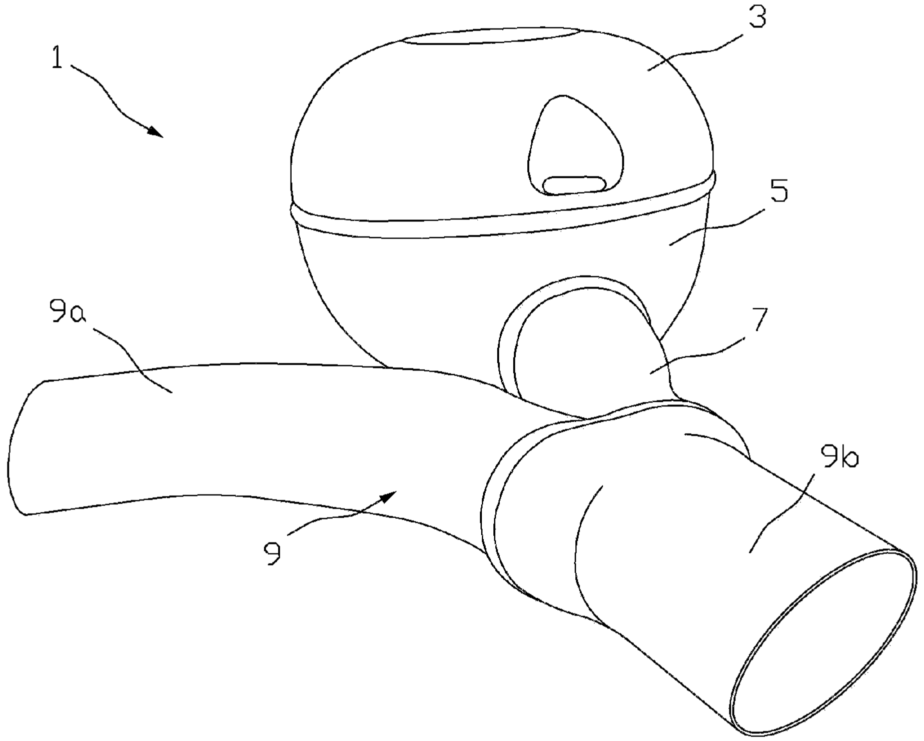
FIG. 1 is a perspective view of a sound generator system in a schematic representation.

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

For sake of clarity, the figures show only those elements, components and functions that are necessary for an understanding of the present invention. However, embodiments of the invention are not limited to the elements, components or functions explained, but instead can also contain other elements, components and functions that are deemed necessary for their particular use or functional scope.

FIG. 1 shows a schematized perspective representation of a sound generator system 1. The sound generator system comprises a sound generator housing, formed in the embodiment shown by an upper shell 3 and a lower shell 5, which can be acoustically connected by a connector piece 7 to the exhaust line 9 of an internal combustion engine (not shown in the figure) in the manner shown. Across section 9*a* of the exhaust line, sonic pulse trains emitted with the exhaust gases from the engine are taken to section 9*b* of the exhaust line, in which they are superimposed with the sound emitted by the sound generator housing.

Figure 2:
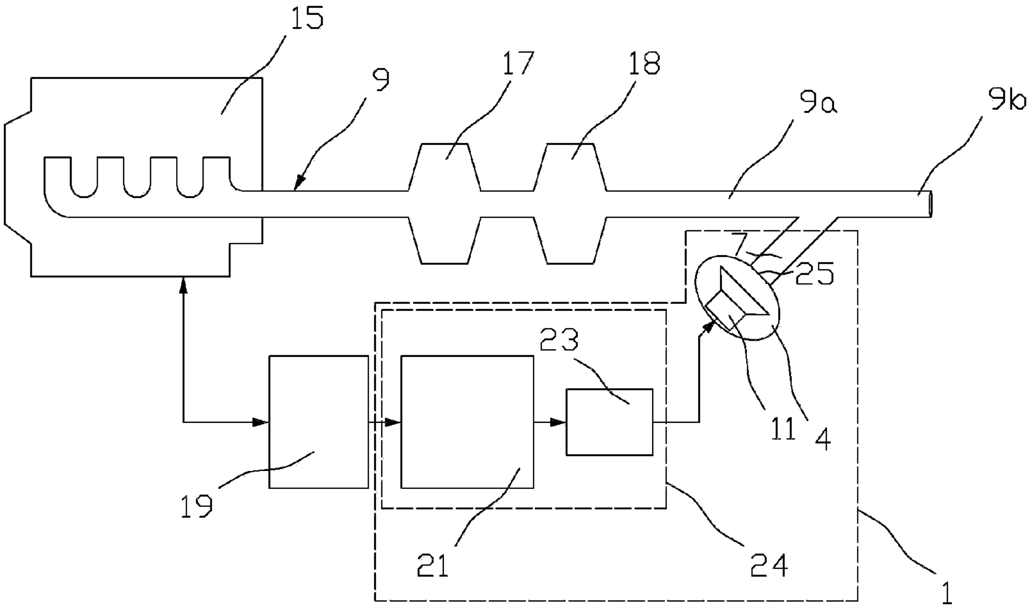
FIG. 2 is a schematic representation to illustrate a sound generator system cooperating with the exhaust system of an internal combustion engine.

The construction of a sound generator system 1 emerges from the schematic representation of FIG. 2. The exhaust gases emitted by an internal combustion engine 15 are taken away to the surroundings via an exhaust line 9. A catalyst 17 for the chemical aftertreatment of the exhaust gases can be arranged in the exhaust line 9. Moreover, a conventional muffler 18 can also be arranged in the exhaust line 9. The sonic pulse trains generated during the combustion process in the engine 15 also propagate with the exhaust gases through the exhaust line 9. In order to modify the exhaust sound produced by the sonic pulse trains, an acoustic signal is generated with an electroacoustic transducer 11 arranged in the sound generator housing 4, which is fed by the connector piece 7 into the region 9*b* of the exhaust line 9, where it is superimposed on the sonic pulse trains originating in the combustion engine. In order to protect the electroacoustic transducer 11 against grime and corrosive gases, the space in which it is contained can be sealed by a sound-propagating membrane 25. The superimposing of the sonic pulse trains by the acoustic signal can occur as indicated in FIG. 2 at the end zone of the exhaust line 9. In other embodiments, the superimposing zone 9*b* is situated further away from the outside mouth of the exhaust line, so that exhaust aftertreatment modules can be arranged between the superimposing zone 9*b* and the mouth of the exhaust line.

Figure 3:
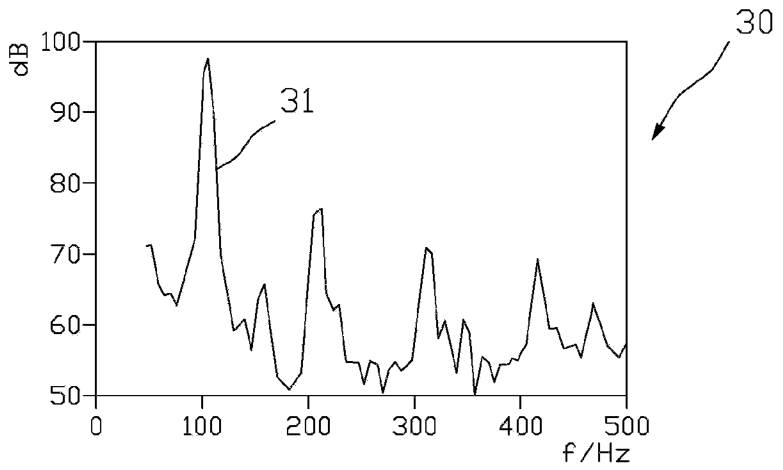
FIG. 3 is a graph representing the frequency dependency of the sonic pressure in the exhaust line for a stationary operating state of an internal combustion engine.

The time variation and frequency spectrum of the sonic pulse trains are influenced by the combustion process in the engine 15. Important factors of influence are the speed and firing order of the engine, but also higher orders of sound emission resulting from the inertia forces of the engine 15. FIG. 3 shows a diagram 30 in which an example is shown for a frequency dependence of the sonic pressure level 31 present in the exhaust line 9 during a particular stationary operating state of an internal combustion engine. It is evident from the diagram of FIG. 3 that the sonic pressure is distinctly higher at a particular frequency and at multiples of this frequency than in the other frequency range. These orders of sonic emission are known as engine orders. According to an embodiment the term engine order refers to the frequency of occurrence of a periodic incidence in an internal combustion engine per cycle. With the engine speed given in rounds per minute (rpm) and the frequency of occurrence of the periodic incidence in Hz, an "engine order" is e.g. defined as the frequency of occurrence of the periodic incidence multiplied by 60 and divided by the engine speed. Factors of influence which dictate the engine orders, such as speed or firing order, are detected or set by the engine control unit 19 and transmitted by it to the sound generator system 1.

For controlling the electroacoustic transducer 11, the sound generator system 1 has a control unit 24, which comprises a control device 21 and an amplifier device 23. The amplifier device 23 amplifies the audio signal generated by the control device 21 into an electrical input signal which is furnished to the electroacoustic transducer 11.

The generating of the audio signal by the control device 21 occurs in several stages or work steps. At first, a primary audio signal is generated, making use of certain engine operating parameters, which is suitable for generating an acoustic signal with certain acoustic pattern qualities by the electroacoustic transducer 11. For an audio signal generation in real time, one usually resorts to signal templates, each of which represents a primary audio signal assigned to a particular engine operating state. To generate a primary audio signal, one then selects or adjusts (making use of electronic circuits) a signal template corresponding to the momentary engine operating state. To keep the expense of generating the primary audio signal within reasonable bounds, i.e., not overburden the software generating of the primary audio signal or make the electronic circuit designed for the generating not too complicated, the frequency range of the primary audio signal is confined to a given value. When using presently available control units for active sound silencing systems, the frequency range is confined to a maximum frequency of around 500 Hz, which produces an acoustic pattern that is perceived as being unnatural.

Therefore, the primary audio signal in the second stage or second work step of the method for generating the audio signal is modified so that it has the typical qualities of an overdriven signal, wherein signal components that go beyond a permissible region are cut off or clipped, or put more precisely, set to a uniform constant maximum value. Such a "cutting off" of the signal peaks has the effect that the modified signal is no longer true in form to the original signal, but rather distorted, so that additional overtones are created in the signal spectrum, representing the proportion of harmonics generated in the signal.

In embodiments, the control unit 24 is configured to selectively amplify selected segments of the primary audio signal so that the resulting signal has a section in which all signal values correspond to a maximum amplitude value that is set for the particular segment, while the graph of the amplified signal is continuous at the transitions from the section to its neighboring sections. Such a signal modification can be done, e.g., by selective amplification of the selected signal segments in such a way that one section of the signal within the particular segment has values above the assigned maximum amplitude value, followed by a subsequent limiting of these values to the maximum amplitude value. By this maximum amplitude value is meant all amplitude values whose absolute value corresponds to a maximum value, whereby the sign may be either positive or negative. The term "continuous" in the present context is to be understood in its mathematical sense, so that the left-side limit of the amplified signal at one of the section boundaries is equal to the right-side limit of the amplified signal at this section boundary, and thus the amplified signal at the section boundaries has no abrupt change, in particular, and also no interruption.

The invention is based on providing a primary signal and dividing the primary signal into selected and non-selected segments. The selected segments are amplified so that the amplified signal in the selected segments has at least one section in which all audio signal values correspond to a maximum amplitude value that is specified for this segment. This creates an amplified segment. The non-selected segments are combined with the selected segments to create an audio signal which is continuous at transitions from the one section to an adjacent section.

Figure 4:
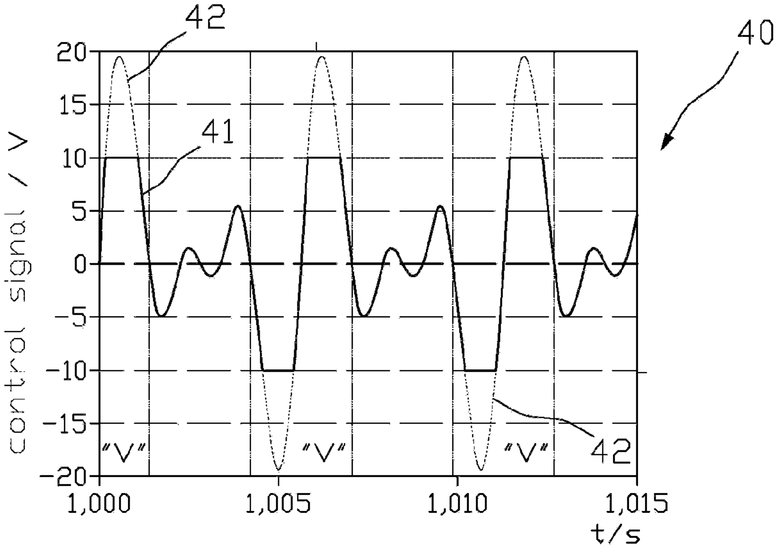
FIG. 4 is an exemplary graph of an audio signal in a schematic representation, resulting in an electroacoustic transducer generating a natural sounding exhaust sound.

An example of such a modified primary audio signal 41 is illustrated schematically in diagram 40 of FIG. 4. In the segments indicated by "V", the modified audio signal 41 represents an amplified version of the primary audio signal, and in the segments other than these the modified audio signal reflects the graph of the primary audio signal. In the example shown in FIG. 4, the maximum amplitude value of the audio signal is limited to 10 volts. This value only represents an example and can take on values different from 10 V, depending on the electroacoustic transducer used to generate the anti-sound, its operating and ambient conditions, the amplifier 23 used to amplify the audio signal, and other such factors of influence. Without the limiting to a maximum amplitude value, the amplifying of the primary audio signal would follow the graph shown by dotted line in the sections established by the amplitude limiting. The limiting has the effect of clipping a correspondingly amplified signal.

The nonlinearities of the signal due to the "clipping" of the amplitude peaks create additional overtones in the signal spectrum, which give the acoustic pattern of the residual exhaust sound a more full body. The gradient of the signal edges can influence which spectral components of the harmonics are enhanced relative to other ones. This gradient depends critically on the ratio of the maximum amplitudes of the signal amplified without limiting, which are the amplitudes of the dotted signal curves 42 in FIG. 4, to the actual maximum value of the signal amplitudes, which are the horizontally running sections of the audio signal 41 at 10 V in FIG. 4. The steeper the gradient, the higher the higher-frequency harmonics content.

According to an embodiment, by amplifying and "clipping" the audio signal in selected segments only, the anti-sound generating function of the audio signal, which is necessary for an active silencing of the noise or sound pulse trains transported with the combustion gases, is basically maintained, while additional higher frequency harmonics are created for achieving a more natural like exhaust sound. According to an embodiment, in the example illustrated in FIG. 4, a segment "V" of each signal period located between two zero-crossings of the primary audio signal that enclose a signal portion having both negative and positive amplitudes (in the following denoted as "sub-period") is amplified selectively. A corresponding selective signal amplification between zero-crossings of the primary signal results in no significant corners of the modified audio signal at the boundaries of the segment, so that practically only the "clipping" of the amplitudes contributes to the generation of higher frequency harmonics.

According to an embodiment, the primary audio signal comprises sequences of identical sectors. Thus, within a sequence the sectors are periodical. The temporal duration of each sequence of identical sectors corresponds to a static operation state of a combustion engine simulated by the primary audio signal. For example, the temporal duration of each sequence of identical sectors may be more than 100 ms and especially more than 200 ms and further especially more than 500 ms. Due to this duration of the sequence of identical sectors, every frequency component of the identical sectors forming the sequence can be considered as a periodic function. In this embodiment, identical segments are selected in each sector of a sequence of identical sectors for amplifying and clipping, the temporal distance between the identical segments of different sectors thus being equal within the sequence of identical sectors.

According to an embodiment that can be combined with the embodiments disclosed above, the primary audio signal is generated in a way that the sound of a hypothetical combustion engine is represented within a given frequency range of for example up to 500 Hz, such as shown in FIG. 3. Thus, the engine orders of the hypothetical combustion engine can be allocated to frequencies of the primary audio signal.

According to a further embodiment that can be combined with the embodiments disclosed above, the boundaries of the segments of the primary audio signal that are selected, amplified and clipped are zero crossings of the primary audio signal in the time domain. The zero crossing relate to the primary signals having an amplitude varying about a zero level (such as an average, mean, predetermined center value/level, rest level, offset rest level).

According to a further embodiment that can be combined with the embodiments disclosed above, the segments of the primary audio signal that are amplified and clipped are selected such that the segment includes the part of the signal having the highest amplitude or the two highest amplitudes, as this part is basically dominated by the first engine order of the hypothetical combustion engine represented by the primary audio signal.

According to a further embodiment that can be combined with the embodiments disclosed above, the segments of the primary audio signal that are amplified and clipped are selected such that the segment includes the part of the signal having a lower amplitude than the two highest amplitudes, as this part is not dominated by the first engine order of the hypothetical combustion engine represented by the primary audio signal but by other engine orders.

Figure 5:
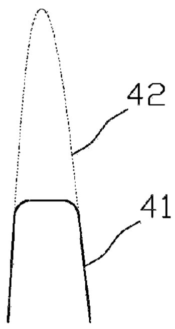
FIG. 5 is an exemplary graph of an audio signal in a schematic representation, resulting in an electroacoustic transducer generating a natural sounding exhaust sound with a reduced content of high-frequency harmonics.

The spectral distribution of harmonic waves can also be influenced by a graduated signal transition to the "clipped" signal section. For example, the gain factor can be reduced at the boundary of the "clipped" area, as illustrated in FIG. 5, so that the control signal 41 is curved instead of having a corner at the section boundary, which reduces the share of higher-frequency upper harmonics.

The generating of an audio signal with amplified signal segments, as described, can be done in various ways. In preferred embodiments, the control device 21 has a software processing device (not shown in the figures) that is configured to calculate a primary audio signal. Certain segments suitable for the acoustic pattern to be generated are then amplified, as described above, by which is meant a calculating of a modified signal whose values in the selected segments are for the most part greater than the original values of the primary audio signal in this region. For example, in embodiments of the software processing device, all values of the primary audio signal can be multiplied by a constant value, the respective multiplied value is compared to a given limit value, which is the maximum amplitude value, and if this value is greater than the limit value it is set at the limit value. Of course, this calculation method deals with the absolute value of a signal value and ignores its sign.

Alternative embodiments of the control unit comprise an electronic amplifier device (not shown in the figures) with a fixed or controllable output signal limiting, wherein the gain factor of the amplifier device can be timed so that only certain signal segments are amplified. The control of the gain factor can be done as a function of engine characteristics, such as the position of the crankshaft.

Further embodiments of the control unit are configured to amplify different segments of the primary control signal, as described, while different courses of the gain factor can be used in the different segments.

Figure 6:
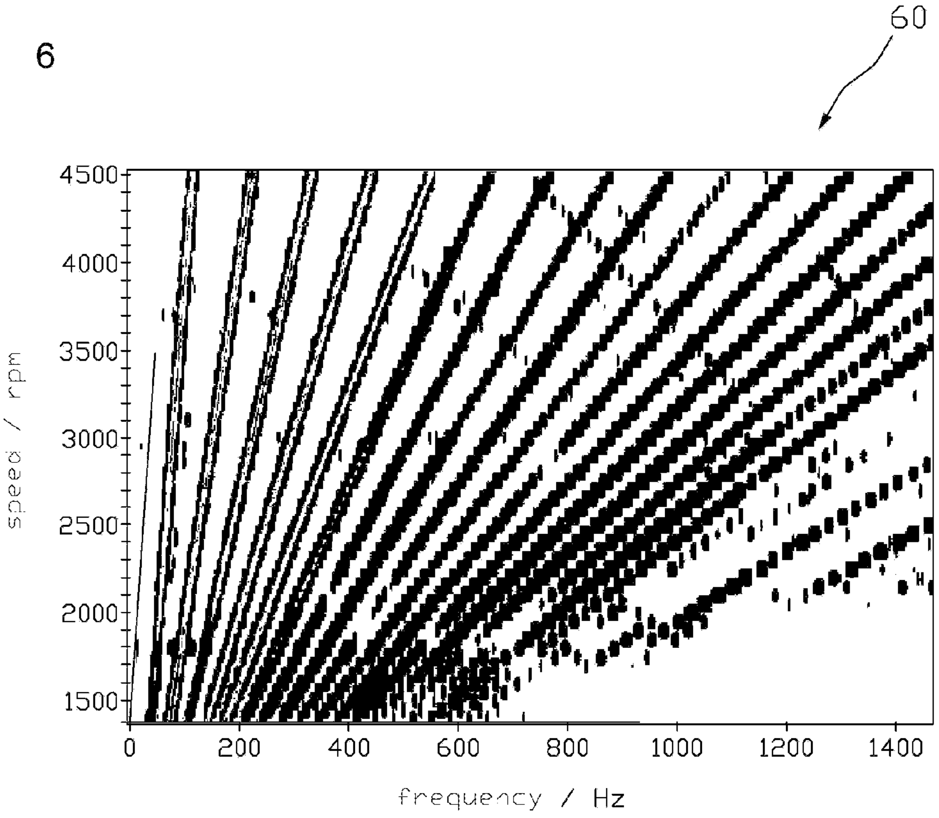
FIG. 6 is the frequency response of individual spectrum components of an audio signal generated by the control unit as a function of engine speed.

In diagram 60 of FIG. 6, the dependency of the frequency spectrum of an audio signal generated according to the above from the engine speed is shown. At lower speeds in the example shown, at first only frequencies up to around 700 Hz contribute to the spectrum of the signal. With increasing speed, the signal spectrum broadens to higher frequencies of up to around 1500 Hz and thus generates an "exhaust sound" usually considered to be natural for the speed.

Thus far the invention has been described with regard to a modification of the exhaust sound of an internal combustion engine. However, it is obvious that the invention can also be used in the described manner to generate a synthetic exhaust sound for vehicles during an operation with electric motors or during a cylinder cutoff.

Figure 7:
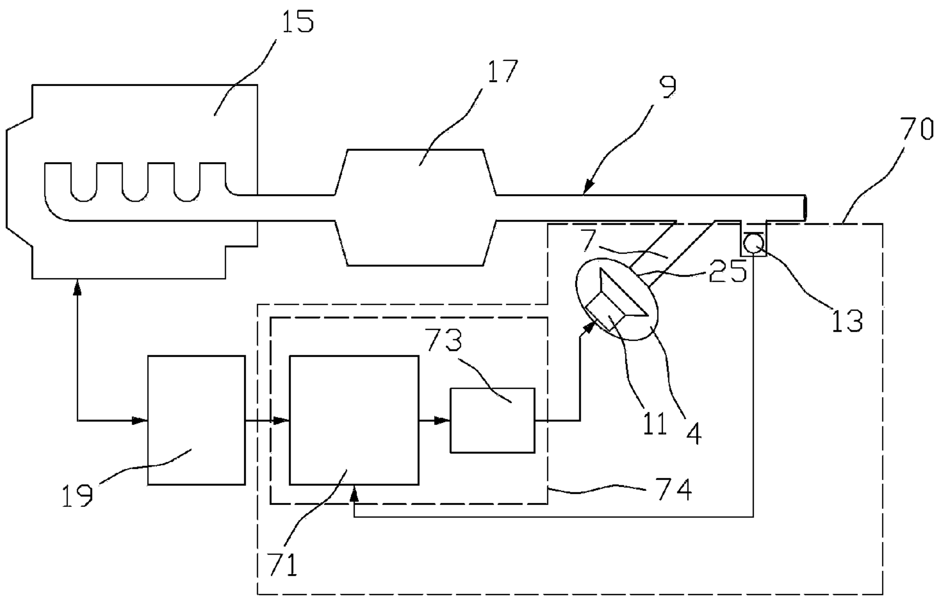
FIG. 7 is a schematic representation to illustrate a sound silencing system with active exhaust sound design in cooperation with the exhaust system of an internal combustion engine.

The described invention can also be implemented in unison with an active sound silencing system. Such a sound silencing system 70 with configurable exhaust sound is illustrated in the schematic representation of FIG. 7. The system shown in the figure has a module 17 for aftertreatment of exhaust gases and a sound silencing system 70 in the exhaust line 9 of the internal combustion engine 15. Different to the diagram, the sound silencing system 70 can also be arranged between engine 15 and exhaust gas aftertreatment module 17.

In contrast with the sound generator system 1 of FIG. 2, the sound silencing system 70 has another electroacoustic transducer 13, which converts the sonic pressure downstream from the input region for the sound waves emitted by the transducer 11 into a corresponding electrical measurement signal. The measurement signal is representative of the residual sound that results from the destructive superimposing of the sonic pulse trains originating in the combustion process in the engine 11 and the sound waves introduced into the exhaust line 9 by the transducer 11.

The measurement signal is taken to the sound silencing control device 71, which generates on this basis a control signal that is amplified by the downstream connected amplifier device 73 and supplied to the sound-generating electromagnetic transducer 11 as an electrical input signal. Control device 71 and amplifier device 73 are part of the control unit 74.

The control signal is basically generated by the sound silencing control device 71 such that the effective value of the difference between normalized measurement signal and audio signal is minimized or adapted to a given value. By normalized measurement signal is meant here a measurement signal whose amplitude values or effective values are adapted to those of the audio signal generated from the primary audio signal. The primary audio signal in the present system has an anti-sound component which serves for the active silencing of the sonic pulse trains originating in the engine and a synthetic component which forms the major component in the as yet harmonic-free acoustic pattern of the desired exhaust sound.

The control unit can have several control sub-units operated independently of each other, in familiar fashion, each of which generates a component of the control signal that is limited to a partial frequency region, usually associated with an engine order. In order to make possible an effective modification of exhaust sounds, it is customary to determine in advance the parameters of the control function used to generate the control signal for certain stationary operating states of the internal combustion engine and have the silencing control device 71 select the parameters according to the respective current engine operating characteristics. According to an embodiment, where control sub-units are used to generate the primary audio signal from a set of primary audio sub-signals, with each primary audio sub-signal being associated with one engine order, the amplification and clipping is only performed with respect to primary audio sub-signals relating to engine orders of interest and thus before combining the primary audio sub-signals to form the primary audio signal.

The described invention enables a simple implementation of exhaust sounds with given levels and with given acoustic patterns that have higher-frequency harmonic contents for creating a natural impression.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

While specific embodiments of the invention have been shown and described in detail to illustrate the application of the principles of the invention, it will be understood that the invention may be embodied otherwise without departing from such principles.

What is claimed is:

1. A sound generator system for a vehicle with internal combustion engine and/or with an electric motor, the sound generator system comprising:

an acoustic line configured for transmission of the sound to the surroundings of the vehicle and/or into an exhaust line of the vehicle;

an electroacoustical transducer configured to produce an acoustical signal in dependence on an electrical input signal, the electroacoustical transducer being connected to the acoustic; and a control unit configured to create a primary audio signal with frequencies from a given frequency range, to selectively amplify selected segments of the primary audio signal so that the amplified audio signal in the selected segments has at least one section in which all audio signal values correspond to a maximum amplitude value that is specified for the segment, and the audio signal amplified in the selected segments is continuous at transitions from the at least one section to neighboring sections of the at least one section, wherein:

the segments are selected in a time domain of the primary audio signal, and the audio signal generated by the control unit forms the basis of the electrical input signal.

2. A sound generator system according to claim 1, wherein the control unit is configured to generate the primary audio signal depending on the respective current operating parameters of the vehicle engine.

3. A sound generator system according to claim 1, wherein the vehicle has an internal combustion engine and the acoustic line is configured for connection to an exhaust line of the engine such that acoustic signals generated by the electroacoustic transducer are superimposed on the exhaust sounds conducted in the exhaust line when the acoustic line is fastened to the exhaust line.

4. A sound generator system according to claim 3, further comprising:

an additional electroacoustic transducer configured to convert a sonic pressure present at a location of the exhaust line into an electrical measurement signal, wherein the location is situated downstream from the connection of the acoustic line to the exhaust flow, and wherein the control unit is configured to generate the primary audio signal depending on the measurement signal.

5. A sound generator system according to claim 1, wherein the acoustic line is configured for connection to the body of a vehicle such that the acoustic signal generated by the acoustic transducer is emitted from the acoustic line directly into an outside region of the vehicle or directly into an inside region of the vehicle.

6. A sound generator system according to claim 2, wherein the control unit is configured to generate the audio signal in the selected segments by:

multiplication of all values of the primary audio signal in the selected segment by a constant value so that the multiplied values in at least one part of the selected segment are greater than a given maximum amplitude value;

comparison of each of the so multiplied values with the given maximum amplitude value, and if so multiplied value is greater than the maximum amplitude value, setting the multiplied value at the maximum amplitude value.

7. A sound generator system according to claim 1, wherein the control unit is configured to generate the audio signal in the selected segments by:

multiplication of all values of the primary audio signal in the selected segment by a constant value so that the multiplied values in at least one part of the selected segment are greater than the given maximum amplitude value;

comparison of each of the multiplied values to the maximum amplitude value;

repeated multiplication of a first multiplied value by a multiplication factor depending on the difference between the first multiplied value and the maximum amplitude value so that a section is formed in the selected segment in which all values of the audio signal correspond to the maximum amplitude value and the audio signal has no corner at the boundaries of this section with the neighboring segments.

8. A sound generator system according claim 2, wherein the control unit has an electronic circuit for generating the audio signal.

9. A sound generator system according to claim 1, wherein the control unit has a software processing device to create the audio signal.

10. A sound generator system according to claim 1, wherein the control unit has an amplifier device that is operated to limit the audio signal in saturation.

11. A sound generator system according to claim 1 in combination with a vehicle with vehicle engine.

12. A sound generator system according to claim 2, wherein the segments of the primary audio signal are selected such that the segment includes the part of the signal having the highest amplitude or the two highest amplitudes.

13. A sound generator system according to claim 2, wherein the segments of the primary audio signal are selected such that the segment includes the part of the signal having a lower amplitude than the two highest amplitudes.

14. A method for generating an audio signal, the method comprising the steps of:

generating a primary audio signal in dependence on parameters that represent current operating characteristics of a vehicle engine, wherein the primary audio signal has frequencies from a given frequency range;

selectively amplifying selected segments of the primary audio signal so that the audio signal amplified in the selected segments has at least one section in which all audio signal values correspond to the maximum amplitude value that is specified for the segment, and the audio signal amplified in the selected segments is continuous at the transitions from the at least one section to neighboring sections of the at least one section, wherein the segments are selected in a time domain of the primary audio signal.

15. A method according to claim 14, wherein the step of selectively amplifying selected segments of the primary audio signal involves the substeps of:

multiplying all values of the primary audio signal in the selected segment by a constant value so that the multiplied values in at least one part of the selected segment are greater than a given maximum amplitude value;

comparing each of the so multiplied values with the given maximum amplitude value; and if the multiplied value is greater than the maximum amplitude value, setting the multiplied value at the maximum amplitude value.

16. A method according to claim 14, wherein the step of selectively amplifying selected segments of the primary audio signal involves the substeps of:

multiplying all values of the primary audio signal in the selected segment by a constant value so that the multiplied values in at least one part of the selected segment are greater than the given maximum amplitude value;

comparing each of the so multiplied values to the maximum amplitude value; and repeating a multiplication of a first multiplied value by a multiplication factor depending on the difference between the first multiplied value and the maximum amplitude value so that at least one section is formed in the selected segment in which all values of the audio signal correspond to the maximum amplitude value and the audio signal has no corner at the boundaries of this section to neighboring sections of the at least one section.

17. A method according to claim 14, wherein:

the primary audio signal comprises sequences of identical sectors; and identical segments are selected in each sector of a sequence of identical sectors for amplifying and clipping, and the boundaries of the selected segments are zero crossings of the primary audio signal in the time domain.

18. A sound generator system for a vehicle with internal combustion engine and/or electric motor, wherein the sound generator system comprises:

a control unit configured to create a primary audio signal with frequencies from a given frequency range, the primary audio signal comprising sequences of identical sectors, the control unit being further configured for signal amplifying and clipping including selectively amplify selected segments of the primary audio signal so that an amplified audio signal in the selected segments has at least one section in which all audio signal values correspond to a maximum amplitude value that is specified for the segment, and the audio signal amplified in the selected segments is continuous at transitions from the at least one section to neighboring sections of the at least one section, the segments being selected in a time domain of the primary audio signal;

an acoustic line configured for transmission of the sound to the surroundings of the vehicle and/or into an exhaust line of the vehicle;

an electroacoustical transducer configured to produce an acoustical signal in dependence on an electrical input signal, the electroacoustical transducer being connected to the acoustic line, wherein:

identical segments are selected in each sector of a sequence of identical sectors for the amplifying and clipping, and the boundaries of the selected segments are zero crossings of the primary audio signal in the time domain; and the audio signal generated by the control unit forms the basis of the electrical input signal.

19. A sound generator system according to claim 18, wherein the segments of the primary audio signal that are amplified and clipped are selected such that the segment includes the part of the signal having the highest amplitude or the two highest amplitudes.

20. A sound generator system according to claim 18, wherein the segments of the primary audio signal that are amplified and clipped are selected such that the segment includes the part of the signal having a lower amplitude than the two highest amplitudes.

* * * * *